United States Patent
Azadi et al.

(10) Patent No.: US 9,283,898 B2
(45) Date of Patent: *Mar. 15, 2016

(54) MULTI-DEVICE DASH MOUNT FOR VEHICLES

(71) Applicant: Omix-Ada, Inc., Suwanee, GA (US)

(72) Inventors: Ali Azadi, Duluth, GA (US); Jacob Heaven, Auburn, GA (US)

(73) Assignee: Omix-Ada, Inc., Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/853,438

(22) Filed: Sep. 14, 2015

(65) Prior Publication Data

US 2016/0001709 A1    Jan. 7, 2016

Related U.S. Application Data

(63) Continuation of application No. 14/531,747, filed on Nov. 3, 2014, now Pat. No. 9,132,779.

(60) Provisional application No. 61/899,774, filed on Nov. 4, 2013.

(51) Int. Cl.
| | |
|---|---|
| *B60R 7/06* | (2006.01) |
| *B60R 11/00* | (2006.01) |
| *B60R 11/02* | (2006.01) |
| *B60R 11/04* | (2006.01) |

(52) U.S. Cl.
CPC ............. *B60R 7/06* (2013.01); *B60R 11/0211* (2013.01); *B60R 11/0241* (2013.01); *B60R 11/0258* (2013.01); *B60R 11/04* (2013.01); *B60R 2011/0005* (2013.01); *B60R 2011/0066* (2013.01)

(58) Field of Classification Search
CPC ............. B60R 7/06; B60R 2011/0005; B60R 2011/0066; B60R 11/0211; B60R 11/0241; B60R 11/04
USPC ................ 224/483, 929; D14/253; 248/187.1
See application file for complete search history.

(56) References Cited

U.S. PATENT DOCUMENTS

| | | |
|---|---|---|
| 2,250,442 A | 7/1941 | Abell |
| 4,066,231 A | 1/1978 | Bahner et al. |
| 5,086,958 A | 2/1992 | Nagy |
| 5,396,556 A | 3/1995 | Chen |
| 5,429,332 A | 7/1995 | Ishikawa |

(Continued)

FOREIGN PATENT DOCUMENTS

EP    0 488 836 A1    6/1992

*Primary Examiner* — Justin Larson
(74) *Attorney, Agent, or Firm* — Womble Carlyle Sandridge & Rice LLP

(57) ABSTRACT

A dash mount for securing a plurality of electronic devices to the front dash of a vehicle. The dash mount includes a base having a top surface with a top slot formed therein, as well as a rotatable mounting screw with a threaded portion extending upward, through the top slot, to project above the top surface. The dash mount also includes a support bracket having a first arm receivable within the top slot and a second arm with a device connector located at its distal end. The mounting screw extends through a straight aperture in the first arm to threadably engage with a first electronic device located on the top surface, to secure both the support bracket and the first device to the base, while the device connector on the second arm receives and supports a second electronic device in a location spaced from the first device.

23 Claims, 6 Drawing Sheets

(56) References Cited

U.S. PATENT DOCUMENTS

| | | |
|---|---|---|
| 5,833,101 A | 11/1998 | Watkins |
| 5,860,573 A | 1/1999 | Hossack et al. |
| 5,979,724 A | 11/1999 | Loewenthal, Jr. et al. |
| 6,173,933 B1 | 1/2001 | Whiteside et al. |
| 7,604,275 B2 | 10/2009 | Vitito |
| 7,690,614 B1 | 4/2010 | Mudd et al. |
| 7,857,268 B2 | 12/2010 | Chiu |
| 8,267,364 B2 | 9/2012 | Church |
| 8,668,179 B2 | 3/2014 | Corn et al. |
| 2005/0282504 A1 | 12/2005 | Yeh |
| 2012/0097723 A1 | 4/2012 | Khatchatrian |

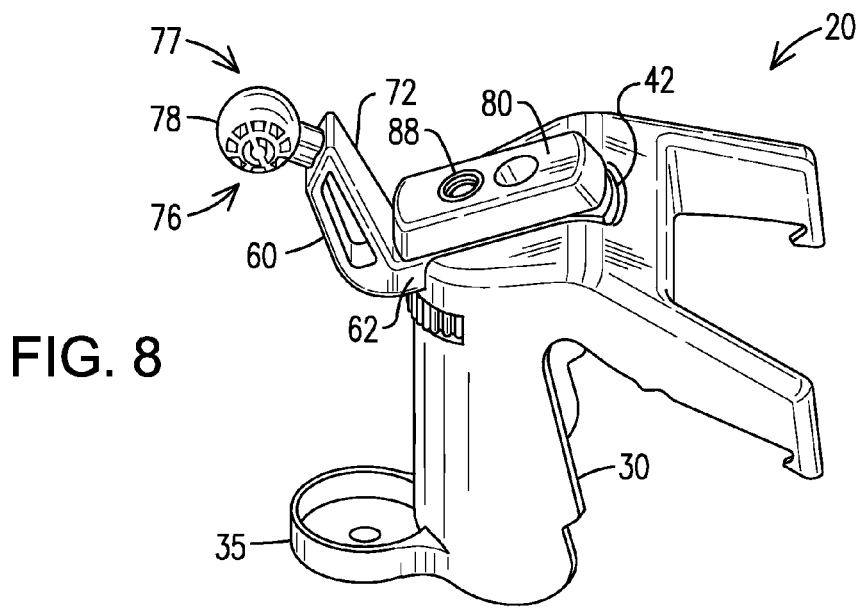
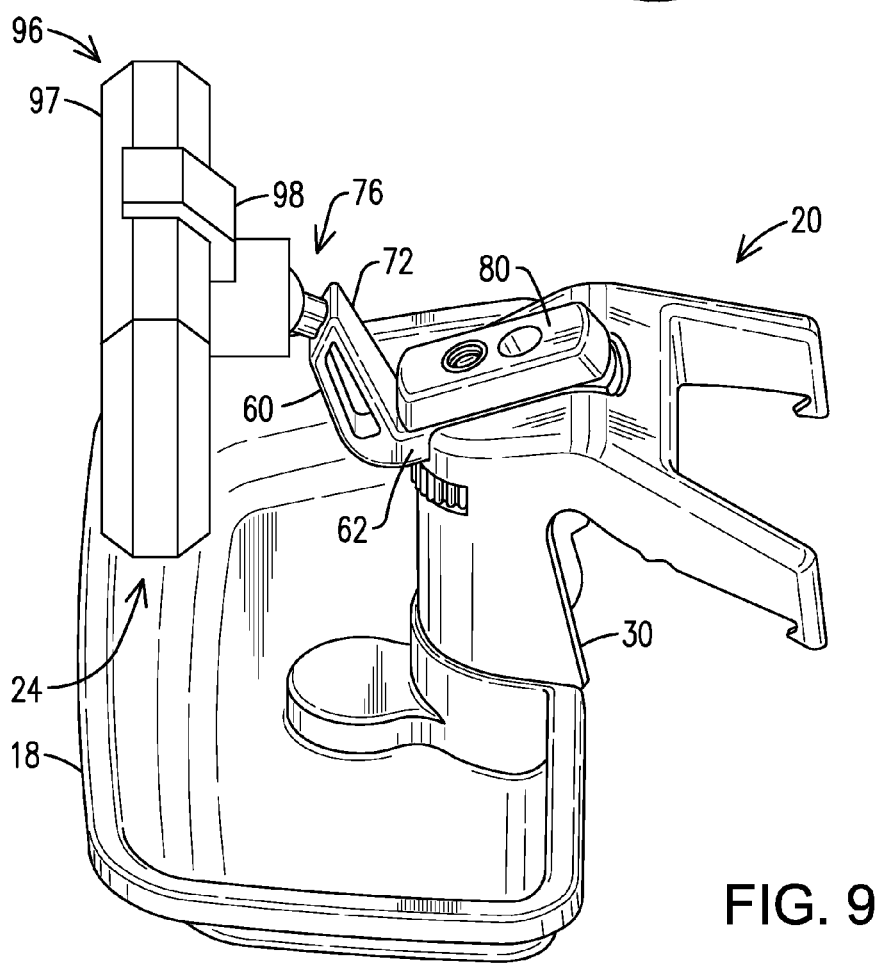

MULTI-DEVICE DASH MOUNT FOR VEHICLES

RELATED APPLICATIONS

This application is a continuation of U.S. patent application Ser. No. 14/531,747, filed Nov. 3, 2014, now U.S. Pat. No. 9,132,779, which claims the benefit of U.S. Provisional Patent Application No. 61/899,774, filed Nov. 4, 2013, each of which is incorporated by reference in its entirety herein, and for all purposes.

TECHNICAL FIELD

The present disclosure relates generally to vehicles and more specifically to dash mounts for removably supporting electronic devices above the front dash of the vehicle.

BACKGROUND

The use of electronic devices in vehicles has greatly expanded in recent years with the advent of GSP devices, cellular telephones, display screens for remote cameras and computer devices, forwardly-directed "dash cams" and digital cameras for recording the travels of the vehicle, tablet computers, and the like.

Many of the electronic devices are stand-alone appliances that may not be integrated into the existing electronics system that is typically located within the front control console of the vehicle. To be useful and safe, these electronic devices must be secured in a position that does not interfere with the driver's handing of the vehicle or impair his vision, and while still being situated to provide information that is readily accessible to the driver and other occupants of the vehicle. Furthermore, many of these electronic devices either do not have suitable mounting systems or their mounting systems are specially configured for that particular device, and are not interchangeable with other devices. In addition, general purpose mounting systems that are not customized to any particular device, whether electronic or non electronic, are still incapable of securing more than one device of a particular type, such as those devices with display screens that must be visible to the driver or those devices requiring an unobstructed view forward through the front windshield.

A need therefore exists for a dash mounting system for vehicles that can removably secure a plurality of interchangeable devices to the front dash of the vehicle. It is to the provision of a multi-device dash mount that addresses these and other needs that the disclosure is primarily directed.

SUMMARY

Briefly described, dash mount for securing a plurality of devices, whether electronic or non-electronic, to the front dash of a vehicle. The dash mount generally includes a base that is securable to the front dash of the vehicle. The base can include a top surface with a top slot formed therein and a mounting screw with a finger wheel that is rotatably mounted within the base and below the top slot. The finger wheel can have a circumferential edge that extends outward through a side surface of the base and that is accessible to an occupant of the vehicle, as well as a threaded portion of the of the mounting screw that extends upward along the axis of rotation, through the top slot, and with the tip end of the threaded portion projecting above the top surface of the base.

The dash mount can also include a support bracket comprising a first arm and a second arm. The first arm can be sized and shaped to be received within the top slot, and include a straight aperture through a thickness thereof for receiving the mounting screw. The second arm can extend away from the first arm to a device connector that is located at the distal end of the second arm. In one of several possible configurations of the dash mount, the threaded portion of the mounting screw can be configured to extend through the straight aperture of the first arm that is positioned within the top slot. The mounting screw can then be threadably engaged with a first device that is positioned atop the first arm and the top surface (such as a forwardly-directed camera, dash cam, strobe light, and the like) to secure both the first device and the support bracket to the base. In addition, the device connector can also be configured to receive and support a second device (such as a GPS receiver, cell phone, tablet PC, and the like) in a location that is spaced from the first device.

The multi-device dash mount can also include a clamp bracket that is also sized and shaped to be received within the top slot. Like the support bracket, the clamp bracket can have a straight aperture for receiving the mounting screw. The clamp bracket may also have an additional threaded aperture that is adapted for threaded engagement with the mounting screw.

In another of several possible configurations of the dash mount, the threaded portion of the mounting screw can extend through the straight aperture of the support bracket positioned within the top slot to threadably engaged with the threaded aperture of the clamp bracket that has been positioned on top the first arm, to secure both the clamp bracket and the support bracket to the base. A device may then be received and supported by the device connector located on the second arm of the support bracket.

In yet another of several possible configurations of the dash mount, the threaded portion of the mounting screw can extend through the straight aperture of the clamp bracket positioned within the top slot to threadably engaged with the first device to secure both the first device and the clamp bracket to the base.

In yet another of several possible configurations of the dash mount, the threaded portion of the mounting screw may be engaged with the threaded aperture of the clamp bracket that has been positioned within the top slot to secure the clamp bracket to the base.

Another embodiment of the disclosure includes a method for securing at least one device to the front dash of a vehicle. The method generally includes the step of securing a base to the front dash of the vehicle, with the base having a top surface having a top slot formed therein and a mounting screw rotatably mounted within the base. The mounting screw can include a finger wheel with a circumferential edge extending outward from a side surface of the base to be accessible to an occupant of the vehicle, and a threaded portion that extends upward through the top slot along an axis of rotation and with a tip end that projects above the top surface.

The method also includes installing one of a support bracket and a clamp bracket into the top slot, with each of the support bracket and the clamp bracket having a straight aperture through a thickness thereof for receiving the mounting screw, with the support bracket having an upwardly-directed extension with a device connector at a distal end thereof. The method further includes positioning a device on top the top surface of the base and rotating the finger wheel to engage the threaded portion of the mounting screw within a threaded aperture formed into a lower face of the device to secure both the device and the support bracket or clamp bracket to the base.

These and other aspects, features, and advantages of the dash mount of this disclosure will become apparent to the skilled artisan upon review of the detailed description set forth below taken in conjunction with the accompanying drawing figures, which are briefly described as follows.

BRIEF DESCRIPTION OF THE DRAWINGS

FIG. 8 is a perspective view of the dash mount of FIG. 1 as may be configured with the support bracket installed within the slot of the base and the clamp bracket positioned on top the support bracket, so as to secure an electronic device in the near mounting position.

FIG. 9 is a perspective view of the dash mount of FIG. 8 with an electronic device secured in the near mounting position above the front dash of a vehicle.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Figure 1:
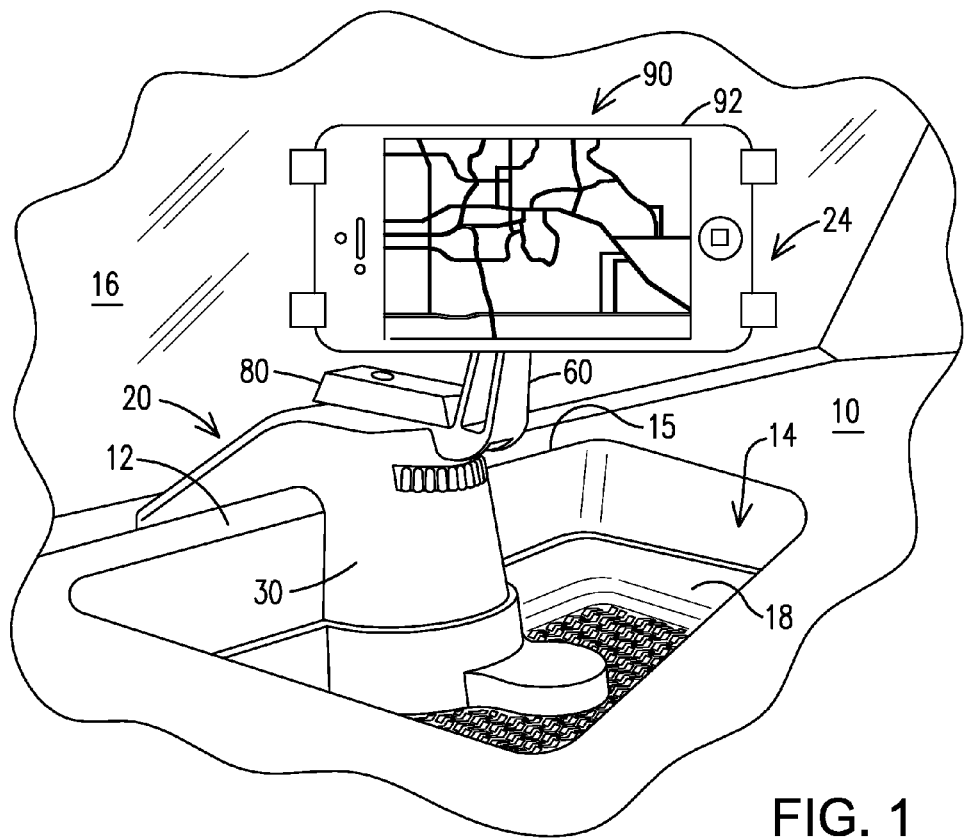
FIG. 1 is a perspective view of a multi-device dash mount securing an electronic device in a near mounting position above the front dash of a vehicle, in accordance with a representative embodiment of the present disclosure.

Reference will now be made in more detail to the drawing figures, wherein like reference numbers, where appropriate, refer to like parts throughout the several views. FIG. 1 illustrates a multi-device dash mount 20 for securing one or more devices 90 to the dash 10 of a vehicle. For example, the device 90 can be a GPS receiver or a "smart" cellular telephone 92 with GPS capabilities that is secured above the dash 10 in a near mounting position 24 that is closest to the driver and other occupants of the vehicle. The dash mount 20 generally includes a base 30 and at least one of a support bracket 60 and a clamp bracket 80, although both can be used in certain configurations such as the one illustrated in the drawing. As discussed in more detail below, the dash mount 20 can be configured to secure a variety of devices above the dash 10 in either the near mounting position (as shown), in a far mounting position proximate the windshield 16, or in both mounting positions at the same time.

The base 30 of the dash mount 20 may be custom-shaped with a backside or bottom surface that conforms to the contact surface 12 of the dash 10 of a particular vehicle. For instance, as illustrated in FIG. 1, the bottom surface of the base 30 can conform to the sharply-defined back edge or ridge 15 of a receptacle 14 that has been pre-formed into the dash 10 of the vehicle, in this case an off-road vehicle, for receiving and holding loose items. Accordingly, in one aspect the base 30 can be made of an easily-formable or moldable material, such as a plastic, a thermoplastic, a thermo-set polymer, a composite material, and the like, that allows for the bottom surface to be formed into any particular shape or profile that matches the features of the intended contact surface 12 of the dash 10.

Figure 2:
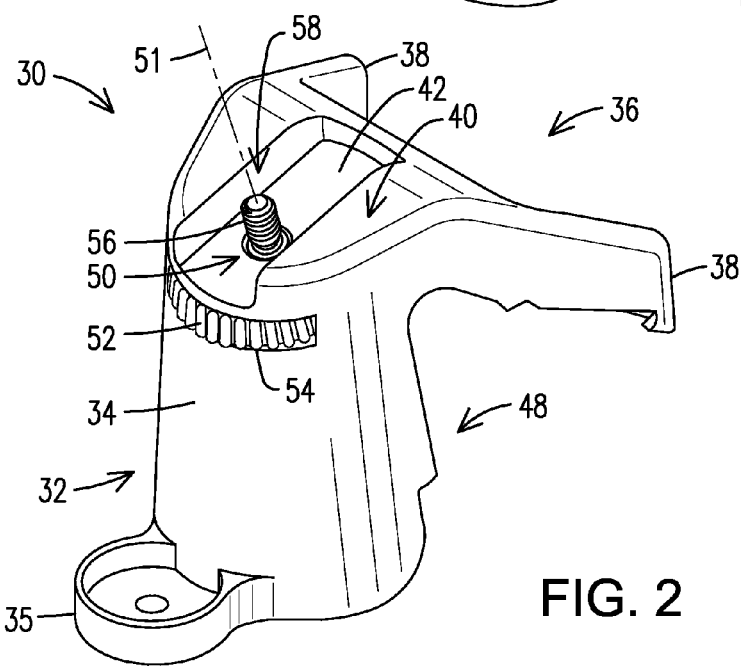
FIG. 2 is a perspective view of the base of the dash mount of FIG. 1, the base having a slot formed into the top surface thereof.

In the embodiment of the dash mount 20 illustrated in FIGS. 1-2, the base 30 generally includes a notch or a top slot 42 formed into its upper or top surface 40, with the top slot 42 having a width and a depth. In addition, the front or near side 32 of the base 30 that faces the occupants of the vehicle may form a pedestal body 34 that extends downward into the receptacle 14 to an attachment tab 35 that is adapted to receive an attachment fastener that secures the base 30 to the dash 10. In one aspect the back or far side 36 of the base 30 may also include one or more stabilizing members or wings 38 that extended downward from the ridge 15 to grip the contact surface 12 of the dash 10 on the far side of the ridge 15.

As indicated above, the base 30 of the dash mount 20 can be formed into a variety of shapes, with the backside or bottom surface(s) 48 of the base 30 matching the contours of the front dash of any particular make and model vehicle, and with the base 30 being secured to the dash with screws, clips, snap fasteners, adhesives and the like. Alternatively, the base may include a suction-type or magnet-type mounting system that secures the base to the dash without requiring that the bottom surface 48 of the base to conform to the contact surface 12 of dash 10. Indeed, the base 30 may be secured to the front dash 10 of the vehicle using any of a wide variety of mounting systems that operate to prevent the base 30 from moving while the vehicle is in motion.

The top slot 42 of the base 30 can extend from the front side 32 to the back side 36 to divide the top surface 40 into two topside surfaces on either side of the top slot 42. In other embodiments the top slot can extend in a different direction than that shown in the figures, or may only intersect with one of the front side 32 or the back side 36 of the base 30 to accommodate the second arm of the support bracket 60. In addition, the elevation of the top surface 40 above the dash 10 can generally raise at least the far mounting position so that a device secured in the far mounting position has a clear view forward through the windshield 16.

The base 30 can also include a mounting screw 50 that is rotatably mounted within the base below the top slot 42. The mounting screw 50 can comprise a finger wheel 52 having a circumferential edge 54 that extends outward through the front or near side 32 of the base 30 to be accessible to an occupant of the vehicle for manually rotating the mounting screw 50. The mounting screw 50 can also comprise a threaded portion 56 that extends upward along an axis of rotation 51, through the top slot 42, and with a tip end 58 that projects above the level of the top surface 40 to engage with the threaded aperture of an object that is supported on the top surface.

Figure 5:
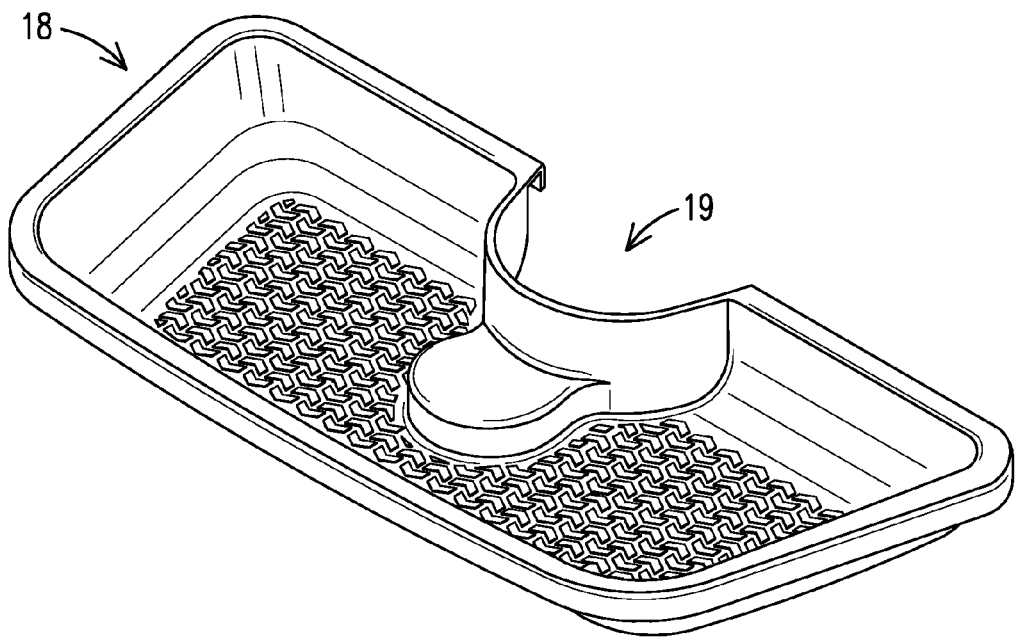
FIG. 5 is a perspective view of a tray that can be used in combination with the dash mount of FIG. 1.

In some embodiments the dash mount 20 may be packaged and sold as a dash mount assembly that includes a tray 18 (FIGS. 1 and 5) which can be removably secured within the receptacle 14 and about the lower portion of the base 30. In one aspect the removable tray 18 may also be modified with surfaces features and recesses 19 that surround the lower portion of the pedestal body 34 and cover the attachment tab 35. Thus, in one aspect the removable tray 18 can be used to cover one or more attachments points for securing the base 30 to the dash 10, so as to provide a more uniform and aesthetically-pleasing appearance while simultaneously providing for the easy cleaning of the receptacle 14.

Figure 3:
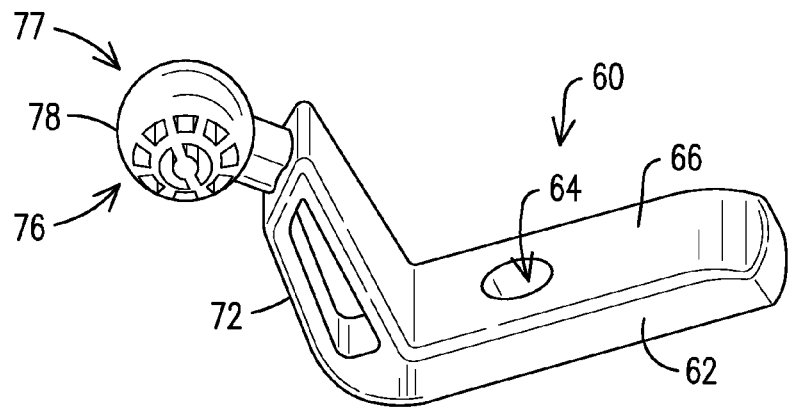
FIG. 3 is a perspective view of the support bracket of the dash mount of FIG. 1.

FIG. 3 is a perspective view of the support bracket 60 that can be installed within the top slot 42 formed into the top surface 40 of the base 30 (FIG. 2). In one aspect the support bracket 60 can comprise a first arm 62 and a second arm 72, with the first arm being removably installed into the top slot with the tip end of the mounting screw projecting upward through a straight aperture 64 formed through the thickness of the first arm 62. The straight aperture 64 can have sufficient clearance so that the threads of the mounting screw 50 do not engage with the sidewalls of the straight aperture 64.

The second arm 72 can extend away from the first arm 62 in a rearward and/or upward direction, and can include a device connector 76 at a distal end 77 that is configured to receive and support a device in the near mounting position that is closest to the driver and other occupants of the vehicle, as illustrated in FIG. 1. In one aspect the device connector 76 can be a ball joint 78 that can be mounted to the distal end or even integrally formed into the distal end 77 of the second arm 72. The ball joint 78 can be configured for removable engagement within a socket receptacle formed into a cradle that is configured, in turn, to receive and hold the device.

Figure 4:
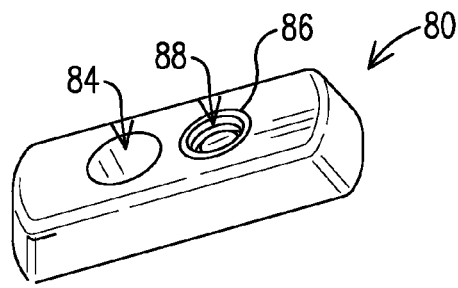
FIG. 4 is a perspective view of the clamp bracket of the dash mount of FIG. 1.

FIG. 4 is a perspective view of the clamp bracket 80 that can have a width and a thickness that is similar to the width and the thickness of the first arm of the support bracket, so that the clamp bracket 80 can also fit within the top slot 42 formed into the top surface 40 of the base 30 (FIG. 2). Like the support bracket 60, the clamp bracket 80 can include a straight aperture 84 that is sized to receive the threaded portion 56 of the mounting screw 50 with sufficient clearance so that the threads of the mounting screw do not engage with the sidewalls of the straight aperture 84. In addition, the clamp bracket 80 can also include a threaded aperture 88 that is configured to threadably engage with the mounting screw. Because both the support bracket 60 and the clamp bracket 80 may be made from a lightweight plastic or composite material that is not sufficiently hard for maintaining a threaded connection with the mounting screw without stripping or damaging the threads, in one aspect the threaded aperture 88 can be provided by a metallic bushing 86 having the threaded aperture 86 formed therein, with the metallic bushing 86 being press-fit or otherwise secured into a hole formed through the clamp bracket 80.

It is to be appreciated that the first arm 62 of the support bracket 60 and the clamp bracket 80 can be interchangeably positioned within the top slot 42 of the base 30 to provide a variety of configurations for the multi-device dash mount 20 for supporting and securing one or more devices above the front dash of the vehicle.

Figure 6:
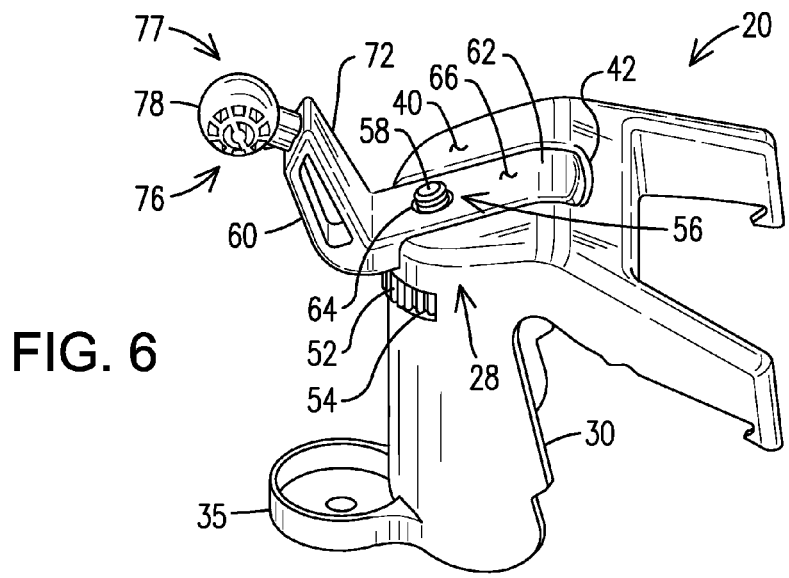
FIG. 6 is a perspective view of the dash mount of FIG. 1 as may be configured with the support bracket installed within the slot of the base, so as to secure electronic devices in both the far and near mounting positions.
Figure 7:
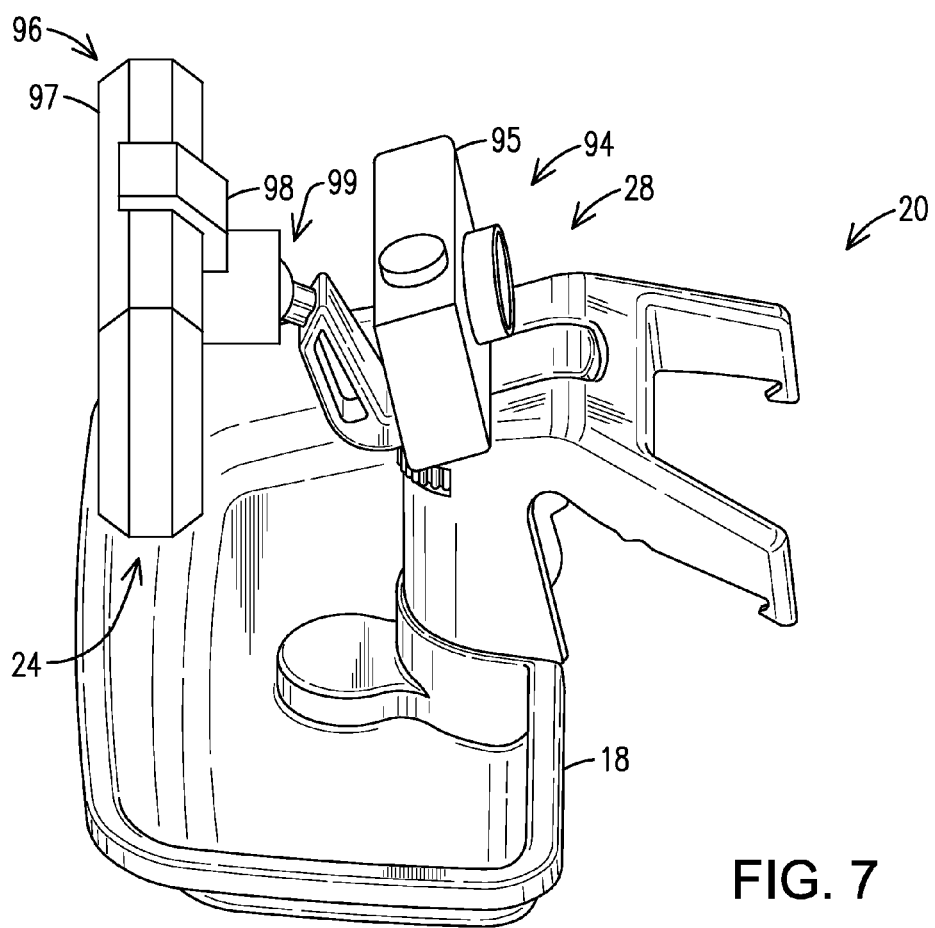
FIG. 7 is a perspective view of the dash mount of FIG. 6 with electronic devices secured in both the far and near mounting positions above the front dash of a vehicle.

As shown in the dual-device configuration of FIGS. 6-7, for example, the first arm 62 of the support bracket 60 can be installed into the top slot 42 of the base 30, with the mounting screw extending upward through the straight aperture 64 in the first arm 62, and with the tip end 58 of the mounting screw projecting beyond both the upper surface 66 of the first arm 62 and the top surface 40 of the base 30 (FIG. 6). This can allow a first or forwardly-facing device 94 (such as a digital camera 95 or digital video device) with a threaded aperture formed into its bottom face to be positioned over the tip end 58 of the mounting screw, and the finger wheel 52 rotated by its circumferential edge 54 until the threaded portion 56 becomes engaged within a threaded aperture of the first device 94 (FIG. 7). Continued rotation of the finger wheel 52 draws the device 94 downward until the bottom surface of the device 94 contacts the top surface 40 of the base, with additional torquing of the finger wheel 52 serving to tightly clamp both the first device 94 and the support bracket 60 to the base 30. In this way the first device 94 can be removably secured within the far mounting position 28 nearest the windshield.

In the dual-device configuration, a second or rearwardly-facing device 96 (such as GPS receiver 97 or cell phone) also can be secured to the dash mount 20 in the near mounting position 24 that is closest to the driver or occupants of the vehicle and spaced from the first device 94. In one aspect the second device 96 can be secured within a cradle 98 that is configured to receive and support the device, and which can also include a socket receptacle 99 configured for removable engagement with the ball joint 78 that extends from the distal end 77 of the second arm 72. As may be appreciated by one of skill in the art, separate cradles that are sized and shaped to hold a variety of different electronic devices (e.g. a GPS receiver, a cell phone, a small tablet PC, etc.) can each be provided with the same type of socket receptacle, so that each of the devices can be interchangeably secured to the device connector 76 of the support bracket 60 as needed.

It is understood that a variety of interconnecting device connectors 76, other than the ball-and-socket connector 78, 99 illustrated herein, may also be available and used by one of skill in the art to secure a device 96 to the distal end 77 of the second arm 72. In addition, the support bracket 60 is not limited to a single second arm 72 with one device connector 76 that supports a lone device in the near mounting position 28. For instance, in other embodiments (not shown) the support bracket 60 can include an additional rearwardly-extending arm for simultaneously supporting two or more devices in near mounting positions 24. These and other variations on the support bracket 60, the rearwardly-extending second arm 72, and the device connector(s) 76 that receive and support the electronic devices in near mounting positions 24 spaced from the far mounting position 28 can be considered to fall within the scope of the present disclosure.

As shown in FIGS. 8-9 (see also FIG. 1), in some situations a user may not wish to secure a device to the dash mount 20 at the far mounting position proximate to the windshield, and instead may only desire to mount a rearwardly-facing device 96 to the near mounting position 24. Without the first device serving as the clamping piece, the clamp bracket 80 can be utilized to provide the clamping body that secures the support bracket 60 to the base 30. In this configuration, the clamp bracket 80 can be positioned on top the first arm 62 of the support bracket 60 that is installed within the top slot 42. The threaded aperture 88 of the clamp bracket 80 can then be engaged with the threaded portion of the mounting screw until both the both the clamp bracket 80 and the support bracket 60 are tightly clamped to the base 30 (FIG. 8). The cradle 98 that supports the rearwardly-facing device 96 can then be coupled to the device connector 76 located at the distal end 77 of the second arm 72 (FIG. 6).

Figure 10:
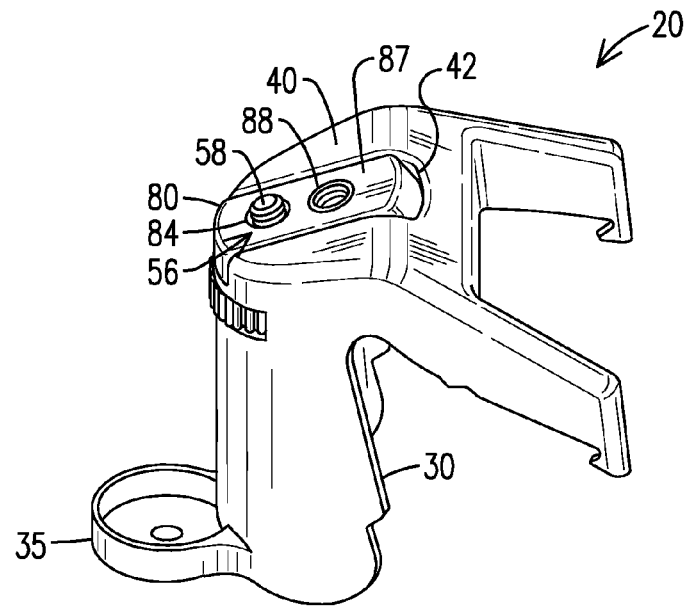
FIG. 10 is a perspective view of the dash mount of FIG. 1 as may be configured with the clamp bracket installed within the slot of the base, so as to secure an electronic device in the far mounting position.
Figure 11:
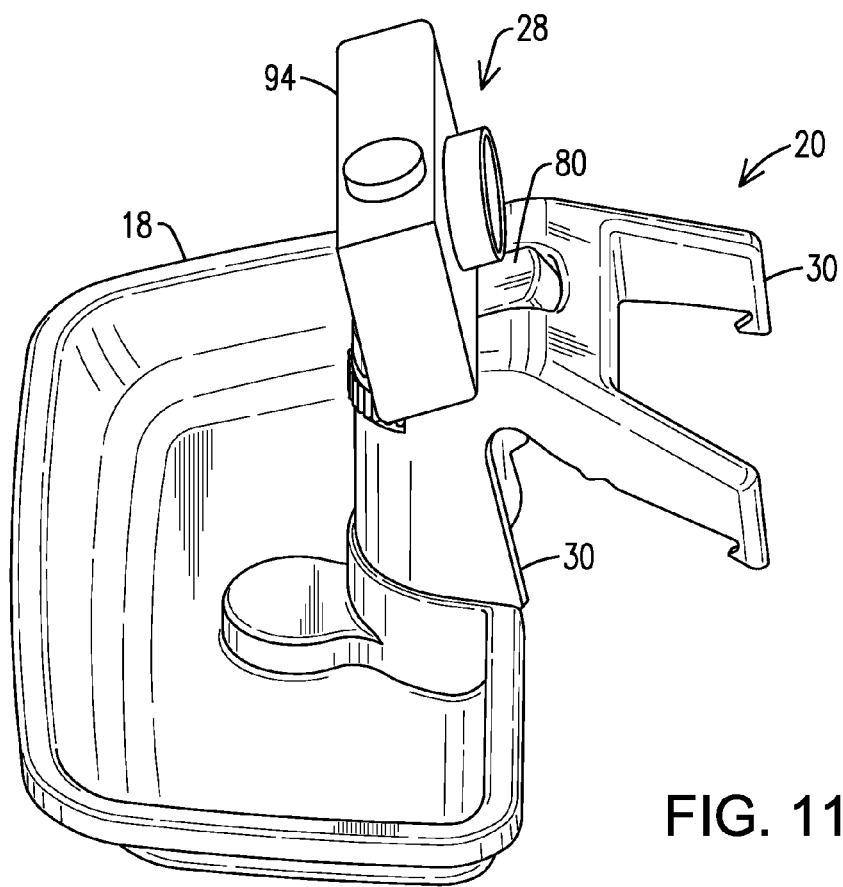
FIG. 11 is a perspective view of the dash mount of FIG. 10 with an electronic device secured in the far mounting position above the front dash of a vehicle.

FIGS. 10-11 together illustrate changing the set-up of the dash mount 20 to yet another configuration for a user not wishing to secure a device to the dash mount 20 in the near mounting position, but instead only desires to mount a forwardly-facing device 94 to the dash mount 20 in the far mounting position 28. Although the support bracket 60 could be used in this configuration, in some cases it may be considered problematic as the upwardly-extending support arm 72 could block the view of a display screen on the back side of the forwardly-facing device 94 (FIG. 7). In its place, the clamp bracket 80 can be installed into the top slot 42 with the threaded portion of the mounting screw being received within the straight aperture 84 of the clamp bracket 80, and the tip end 58 projecting upward beyond both the upper surface of the clamp bracket 80 and the top surface 40 of the base. As shown in FIG. 11, the device 94 can be positioned over the tip end 58 of the mounting screw 50 and the threaded aperture located in the bottom face of the device 94 engaged by the threaded portion 56 of the mounting screw until both the device 94 and the clamp bracket 80 are tightly clamped to the base 30. In one aspect this configuration of the clamp bracket 20 may be advantageous by allowing the occupants of the vehicle to monitor the display screen of the forward facing device 94 without the second arm of the support bracket obstructing the view.

Figure 12:
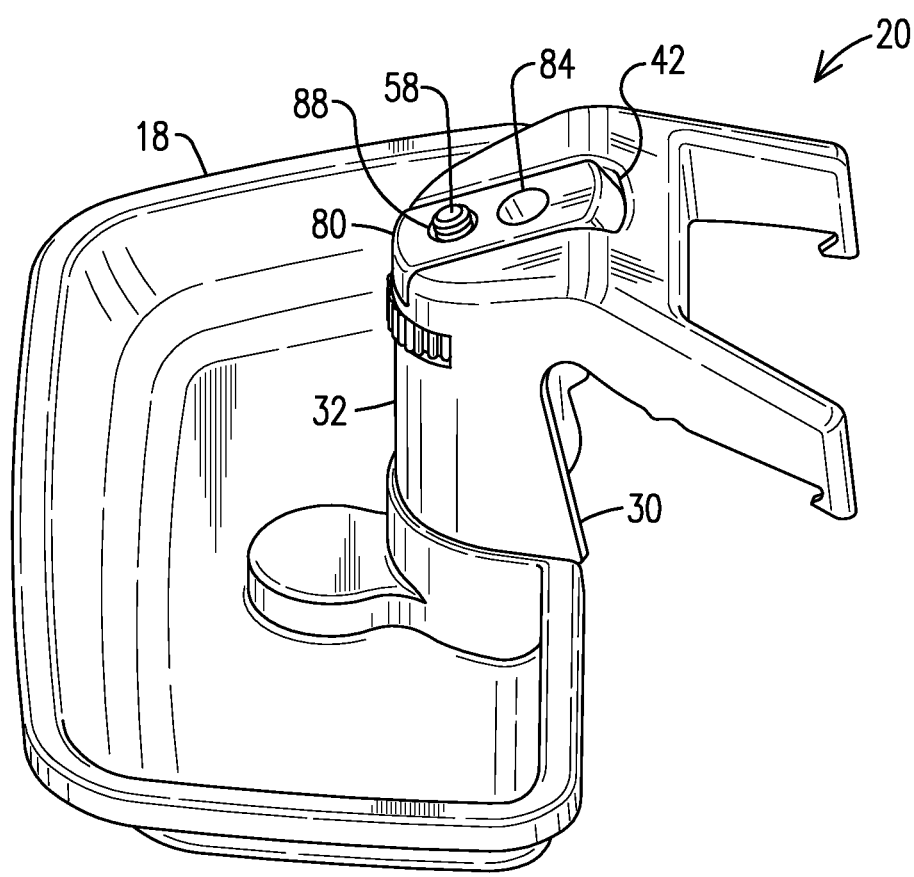
FIG. 12 is a perspective view of the dash mount of FIG. 1 as may be configured with the clamp bracket being secured within the slot of the base and without an electronic device in either of the near or far mounting positions.

FIG. 12 illustrates changing the set-up of the dash mount 20 to yet another configuration for a user temporarily not wishing to secure a device to the dash mount 20 either in the near mounting position or in far mounting position, but also not desiring to remove the base 30 from its location secured to the dash 10 of the vehicle. In this case, the clamp bracket can be rotated 180 degrees and secured within the top slot 42 with the threaded portion 56 of the mounting screw directly engaging the threaded aperture 88 of the clamp bracket 80. Thus, in one aspect the clamp bracket 80 can be reversible with both ends of the clamp bracket being configured to form a substantially continuous surface across the front or near side 32 of the base 30. This configuration of the clamp bracket may be considered advantageous by filling the empty top slot 42 of the base 30 that may otherwise appear unsightly, or by simply retaining the clamp bracket 80 in a known location when not in use.

The invention has been described herein in terms of preferred embodiments and methodologies considered by the inventor to represent the best mode of carrying out the invention. It will be understood by the skilled artisan, however, that a wide range of additions, deletions, and modifications, both subtle and gross, may be made to the illustrated and exemplary embodiments without departing from the spirit and scope of the invention. For example, the device mount of the present invention is not limited to securing only electronic devices, but may also be used to secure non-electronic devices or apparatus to the dash of the vehicle such as magnetic compasses, note pad holders, air fresheners, knick-knack holders, and the like. These and other revisions might be made by those of skill in the art without departing from the spirit and scope of the invention that may be further defined by the following aspects.

What is claimed is:

1. A dash mount for securing a plurality of devices to the front dash of a vehicle, the dash mount comprising:
   a base securable to the front dash of the vehicle with a top surface having a retention structure for restricting rotation;
   an attachment mechanism mounted within the base having a connecting tip projecting upward through and above the top surface; and
   a support bracket including:
      a first end portion engageable by the retention structure and having a straight aperture through a thickness thereof for receiving the connecting tip without engagement; and
      a second end portion extending away from the first end portion and having a device connector at a distal end thereof,
   wherein the connecting tip of the attachment mechanism is configured to engage a first device positioned on top the first end portion to secure both the first device and the support bracket to the base, and
   wherein the device connector is configured to receive and support a second device in a location spaced from the first device.

2. The dash mount of claim 1, wherein the support bracket is engaged with and rotatably restricted by the retention structure and the connecting tip extends upward through the straight aperture of the support bracket to engage with a complimentary connection port formed into a lower face of the first device to secure both the first device and the support bracket to the base.

3. The dash mount of claim 1, further comprising a clamp bracket engageable by the retention structure and having a straight aperture through a thickness thereof for receiving the connecting tip without engagement and a complimentary connection aperture adapted to engage with the connecting tip.

4. The dash mount of claim 3, wherein the support bracket is engaged with and rotatably restricted by the retention structure and the connecting tip extends upward through the straight aperture of the support bracket to engage with the complimentary connection aperture of the clamp bracket positioned on top the first end portion to secure both the clamp bracket and the support bracket to the base.

5. The dash mount of claim 3, wherein the clamp bracket is engaged with and rotatably restricted by the retention structure and the connecting tip extends upward through the straight aperture of the clamp bracket to engage with a complimentary connection port formed into a lower face of the first device to secure both the first device and the clamp bracket to the base.

6. The dash mount of claim 3, wherein the clamp bracket is engaged with and rotatably restricted by the retention structure and the connecting tip is engaged with the complimentary connection aperture of the clamp bracket to secure the clamp bracket to the base.

7. The dash mount of claim 1, wherein the attachment mechanism further comprises an actuator accessible to an occupant of the vehicle and operable to engage the connecting tip with the first device.

8. The dash mount of claim 1, wherein the attachment mechanism further comprises a mounting screw rotatably mounted within the base and the connecting tip further comprises a threaded tip end of the mounted screw.

9. The dash mount of claim 1, wherein the retention structure is formed into the top surface of the base.

10. The dash mount of claim 9, wherein the retention structure further comprises at least one slot formed into the top surface of the base.

11. The dash mount of claim 1, wherein the base further comprises a bottom surface that is securable to a contact surface on the dash of the vehicle.

12. The dash mount of claim 11, wherein the bottom surface is conformable to the contact surface.

13. The dash mount of claim 1, wherein the support bracket is L-shaped with the second end portion extending upwardly above the first end portion when the first end portion is engaged by the retention structure.

14. The dash mount of claim 1, wherein the device connector further comprises a spherical ball connector.

15. The dash mount of claim 14, wherein the second device is secured in a cradle having a socket connector that is engageable with the ball connector.

16. The dash mount of claim 1, wherein the first device is a digital camera.

17. The dash mount of claim 1, wherein the second device is a GPS display.

18. A dash mount for securing at least one device to the front dash of a vehicle, the dash mount comprising:
  a base securable to the front dash of the vehicle and including:
    a top surface having a retention structure for restricting rotation; and
    an attachment mechanism positioned within the base and including a connecting tip projecting upward through and above the top surface;
  at least one of a support bracket and a clamp bracket, the support bracket including:
    a first end portion engageable by the retention structure and having a straight aperture through a thickness thereof for receiving the connecting tip without engagement; and
    a second end portion extending away from the first end portion and having a device connector at a distal end thereof; and
  the clamp bracket engageable by the retention structure and having a straight aperture through a thickness thereof for receiving the connecting tip without engagement and a complimentary connection aperture adapted to engage with the connecting tip,
  wherein the connecting tip is configured extend through a straight aperture to engage with a complimentary connection port formed into a lower face of a first device positioned on top the support bracket or clamp bracket that is engaged with and rotatably restricted by the retention structure, to secure both the first device and the support bracket or clamp bracket to the base.

19. The dash mount of claim 18, wherein the support bracket is engaged with and rotatably restricted by the retention structure and the device connector of the support bracket is configured to receive and support a second device in a location spaced from the first device.

20. The dash mount of claim 18, wherein the attachment mechanism further comprises an actuator accessible to an occupant of the vehicle and operable to engage the connecting tip with the complimentary connection port formed into a lower face of a first device.

21. The dash mount of claim 20, wherein the attachment mechanism further comprises a mounting screw rotatably mounted within the base and the actuator further comprises a finger wheel with a circumferential edge extending outward from a side surface of the base and accessible to an occupant of the vehicle.

22. A method for securing at least one device to the front dash of a vehicle, the method comprising:
  securing a base to the front dash of the vehicle, the base including:
    a top surface having a retention structure for restricting rotation; and
    an attachment mechanism mounted within the base including an actuator accessible to an occupant of the vehicle and a connecting tip projecting upward through and above the top surface;
  engaging one of a support bracket and a clamp bracket with the retention structure to restrict the rotation thereof, each of the support bracket and the clamp bracket having a straight aperture through a thickness thereof for receiving the connecting tip without engagement, with the support bracket having a device connector at a distal end opposite a proximal end that is engageable with the retention structure;
  positioning a device on top the support bracket or clamp bracket; and
  actuating the actuator to engage the connecting tip of the attachment mechanism with a complimentary connection port formed into a lower face of the device to secure both the device and the support bracket or clamp bracket to the base.

23. The method of claim 19, further comprising mounting a second device to the device connector of the support bracket when the support bracket is engaged with and rotatably restricted by the retention structure.

* * * * *